(12) United States Patent
Hartmann et al.

(10) Patent No.: US 9,874,642 B2
(45) Date of Patent: Jan. 23, 2018

(54) SCINTILLATORS COMPRISING AN ORGANIC PHOTODETECTION SHELL

(71) Applicant: Siemens Aktiengesellschaft, Munich (DE)

(72) Inventors: David Hartmann, Erlangen (DE); Patric Buechele, Erlangen (DE); Sandro Francesco Tedde, Weisendorf (DE); Oliver Schmidt, Erlangen (DE); Andreas Kanitz, Hoechstadt (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/105,320

(22) PCT Filed: Dec. 11, 2014

(86) PCT No.: PCT/EP2014/077352
§ 371 (c)(1),
(2) Date: Jun. 16, 2016

(87) PCT Pub. No.: WO2015/091196
PCT Pub. Date: Jun. 25, 2015

(65) Prior Publication Data
US 2016/0313452 A1    Oct. 27, 2016

(30) Foreign Application Priority Data
Dec. 18, 2013 (DE) .................. 10 2013 226 338
Jun. 27, 2014 (DE) .................. 10 2014 212 424

(51) Int. Cl.
*G01T 1/20* (2006.01)
*G01T 1/16* (2006.01)
(Continued)

(52) U.S. Cl.
CPC .......... *G01T 1/2006* (2013.01); *C09K 11/025* (2013.01); *C09K 11/7771* (2013.01);
(Continued)

(58) Field of Classification Search
CPC .................................. G01T 1/16; G01T 1/20
(Continued)

(56) References Cited

U.S. PATENT DOCUMENTS

| | | | |
|---|---|---|---|
| 4,420,444 A | 12/1983 | Yamada et al. | 264/21 |
| 6,483,099 B1 | 11/2002 | Yu et al. | 250/214.1 |

(Continued)

FOREIGN PATENT DOCUMENTS

| | | | |
|---|---|---|---|
| DE | 10137012 A1 | 2/2003 | G21K 1/10 |
| DE | 102006023454 A1 | 11/2007 | G01T 1/29 |

(Continued)

OTHER PUBLICATIONS

German Office Action, Application No. 102013226338.4, 5 pages, dated Feb. 7, 2014

(Continued)

*Primary Examiner* — David Porta
*Assistant Examiner* — Meenakshi Sahu
(74) *Attorney, Agent, or Firm* — Slayden Grubert Beard PLLC (57) ABSTRACT

A coated scintillator particle, a scintillator particle coated with a semiconducting photoactive material, a method for producing such scintillator particles, an x-ray detector, a gamma-ray detector, and a UV detector using such coated scintillator particles, a method for producing such x-ray detector, gamma-ray detector, or UV detector, and the use of the coated scintillator particles for detecting high-energy radiation, e.g., radiation, gamma radiation and/or x-rays, are disclosed.

23 Claims, 7 Drawing Sheets

(51) Int. Cl.
*C09K 11/02* (2006.01)
*C09K 11/77* (2006.01)
*C23C 4/04* (2006.01)

(52) U.S. Cl.
CPC .................. *C23C 4/04* (2013.01); *G01T 1/16* (2013.01); *G01T 1/20* (2013.01)

(58) Field of Classification Search
USPC .................................................... 250/361 R
See application file for complete search history.

(56) References Cited

U.S. PATENT DOCUMENTS

| | | | |
|---|---|---|---|
| 7,625,502 B2 | 12/2009 | Clothier et al. | 252/301.4 H |
| 7,858,948 B2 | 12/2010 | Metzger et al. | 250/370.11 |
| 8,637,831 B2 | 1/2014 | Hayden et al. | 250/370.11 |
| 2006/0054863 A1* | 3/2006 | Dai | B82Y 10/00 |
| | | | 252/301.4 R |
| 2008/0237470 A1 | 10/2008 | Loureiro et al. | 250/361 R |
| 2009/0179155 A1 | 7/2009 | Weinberg | 250/370.01 |
| 2011/0095266 A1 | 4/2011 | Hayden et al. | 257/21 |
| 2012/0145962 A1 | 6/2012 | Fukuta et al. | 252/301.4 R |
| 2012/0217419 A1 | 8/2012 | Riesen et al. | 250/473.1 |
| 2013/0001471 A1 | 1/2013 | Srivastava et al. | 252/301.6 P |
| 2013/0026371 A1 | 1/2013 | Holloway et al. | 250/362 |
| 2013/0032720 A1* | 2/2013 | Lee | G01T 1/20 |
| | | | 250/361 R |
| 2013/0082207 A1 | 4/2013 | Srivastava et al. | 252/301.4 R |
| 2014/0291528 A1 | 10/2014 | Jagannathan et al. | 250/361 R |

FOREIGN PATENT DOCUMENTS

| | | | | |
|---|---|---|---|---|
| DE | 112008000738 T5 | 2/2010 | | C01F 17/00 |
| DE | 102008029782 A1 | 3/2012 | | H01L 51/42 |
| DE | 102010043749 A1 | 5/2012 | | G01T 1/20 |
| DE | 102010062208 A1 | 5/2012 | | A61B 6/03 |
| DE | 102013200881 A1 | 7/2014 | | C09K 11/00 |
| WO | 2015/091196 A1 | 6/2015 | | G01T 1/16 |

OTHER PUBLICATIONS

German Office Action, Application No. 102014212424.7, 7 pages, dated Dec. 22, 2014.
International Search Report and Written Opinion, Application No. PCT/EP2014/077352, 23 pages, dated Mar. 19, 2015.

* cited by examiner

SCINTILLATORS COMPRISING AN ORGANIC PHOTODETECTION SHELL

CROSS-REFERENCE TO RELATED APPLICATIONS

This application is a U.S. National Stage Application of International Application No. PCT/EP2014/077352 filed Dec. 11, 2014, which designates the United States of America, and claims priority to DE Application No. 10 2013 226 338.4 filed Dec. 18, 2013, and DE Application No. 10 2014 212 424.7 filed Jun. 27, 2014, the contents of which are hereby incorporated by reference in their entirety.

TECHNICAL FIELD

The present invention relates to a coated scintillator particle with a scintillator particle being coated with a photoactive material. The present invention also relates to a method for the production of such coated scintillator particles, an X-ray detector, gamma detector or UV detector in which the coated scintillator particles are used, a method for the production of such an X-ray detector, gamma detector or UV detector and the use of the coated scintillator particles for detecting high-energy radiation, in particular UV radiation, gamma radiation and/or X-rays.

BACKGROUND

Figure 1:
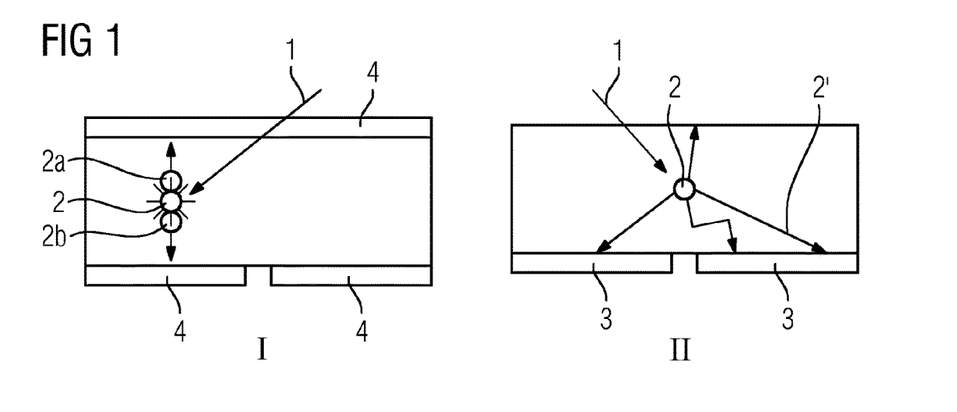
FIG. 1 is a schematic comparison of the concepts of direct X-ray conversion and indirect X-ray conversion.

The invention addresses a new type of production method for digital X-ray detectors, such as those used inter alia in medical diagnosis. As a rule, the size of these detectors is between 20×20 cm$^2$ and 43×43 cm$^2$. The current prior art is represented by detectors based on amorphous silicon (indirect conversion) and amorphous selenium (direct conversion). The principles of direct conversion (left) and indirect conversion (right) are shown in FIG. 1. With direct conversion I, an X-ray quantum 1 stimulates a particle 2, wherein electron/hole pairs 2a, 2b are generated and then migrate to the electrodes 4 (anode or cathode, for example pixel electrodes) where they are detected. With indirect conversion II, the X-ray quantum 1 stimulates the particle 2, which in turn emits radiation 2' with low energy (for example visible light, UV or IR radiation), which is then detected by means of a photodetector 3 (for example a photodiode).

Indirect X-ray conversion includes the combination of a scintillator layer (for example Gd2O2S or CsI with different doping materials such as terbium, thallium, europium, etc.; layer thicknesses typically 0.1-1 mm) and a photodetector (preferably a photodiode). The emission wavelength of the scintillator light by means of X-ray conversion overlaps the spectral sensitivity of the photodetector.

In the case of direct X-ray conversion, the X-rays are, for example, again converted directly into electron/hole pairs, which are read out electronically (for example amorphous Se). Direct X-ray conversion into selenium is usually performed with layers with a thickness of up to 1 mm, which are pretensioned in the kV range in the blocking direction. While indirectly converting detectors have become established, in particular because they are simple and inexpensive to produce, direct converters have a much better resolving power.

One alternative to the aforementioned X-ray detectors based on inorganic semiconductors is hybrid-organic detectors, which to date are usually produced by application from the liquid phase. This in particular facilitates simple processing on large areas of up to 43×43 cm$^2$ or more. The production of the detectors generally includes the introduction of the inorganic absorber materials such as, for example, typical scintillator materials into an organic matrix. Organic semiconductors can be easily applied to large areas from the liquid phase and the direct incorporation of the inorganic scintillator granules enables the optical cross talk to be significantly minimized.

Organic semiconductors have lower conductivity than inorganic semiconductors. This limited conductivity is problematic if, as for example with X-ray absorption, very thick layers are required to achieve sufficient sensitivity. This, on the one hand, reduces the efficiency of the photodiode since charge carrier extraction is impeded. On the other hand, the speed of the photodiode is reduced which limits usage for medical equipment, for example in the field of mammography in which only soft X-rays with a low penetration depth are used.

Organic semiconductors are primarily deposited from the liquid phase or in vacuum. All methods known to date for the incorporation of inorganic absorber materials use processing from the liquid phase.

U.S. Pat. No. 6,483,099 B1 describes the possibility of X-ray detection with a scintillator layer on an OPD (organic photodiode). Further embodiments include X-ray detection by the incorporation ("admixture") of scintillators into an OPD, scintillators as a substrate or as part of the electrode. There is no information as how a scintillator can be incorporated homogeneously into a thick OPD layer or how, for example, to produce a 100 µm thick hybrid diode.

DE 101 37 012 A1 discloses an embodiment of a light-sensitive and polymer absorber layer with embedded scintillator granules. The conductivity of the polymeric layer is increased by the absorption of light from the scintillator. The mean distance of the scintillator granules in the layer corresponds to the mean free path length of the photons from the scintillator in the polymer.

DE 10 2010 043 749 A1 relates to an X-ray detector based on the above-described concept, wherein scintillators are either directly dispersed into the organic semiconductor solution or sprayed on in a "co-spraying process" at the same time as the organic semiconductor material.

The first case with liquid-phase application gives rise to the problem of creating a stable dispersion which is, in particular difficult with large scintillator particles. With small particles it is usual to add dispersing agents in order to prevent agglomeration of the particles, but this has a negative influence on the electrical properties of the organic semiconductors.

Both methods (liquid-phase application and vacuum deposition) have the drawback that, with the application of very thick layers (100 µm or more), enormous quantities of solvents have to be released and the layers are very rough. Complete evaporation of the solvents is not only a technical requirement, it also represents a health and critical environmental problem.

Hence, there is a requirement for the production of X-ray detectors based on inorganic absorber materials, such as typical scintillator materials, which are incorporated into an organic semiconductor matrix. This combination should have the advantages of combining the two aforementioned concepts with one another. Organic semiconductors are easy to apply to large areas from the liquid phase and the direct incorporation of the inorganic scintillator granules enables optical crosstalk to be significantly minimized. The main problem with these hybrid-organic photodetectors is the processing of thick layers. The material suggested here enables the production of thick layers.

SUMMARY

One embodiment provides a coated scintillator particle wherein the scintillator particle is coated with a semiconducting photoactive material.

In a further embodiment, the scintillator particle has a diameter of 0.01 to 50 µm, preferably 0.5 to 20 µm, more preferably of 1 to 10 µm.

In a further embodiment, the coating of the photoactive material has a thickness of 15 to 1500 nm, preferably 50 to 1000 nm, more preferably 100 to 1000 nm, particularly preferably 150 to 600 nm.

In a further embodiment, the photoactive material is an organic photoactive material and/or a perovskite semiconductor material.

In a further embodiment, the photoactive material is a photoactive layer in the form of a bulk heterojunction.

Another embodiment provides a method for the production of coated scintillator particles wherein at least one semiconducting photoactive material is dissolved by means of at least one first solvent, the scintillator particles are added to the solution, the coated scintillator particles are then precipitated by adding a further substance and finally the first solvent and the further substance are removed.

In a further embodiment, the scintillator particles are not soluble in the first solvent.

In a further embodiment, the photoactive material comprises at least two organic compounds.

In a further embodiment, the scintillator particles are added to the solution while the solution is exposed to ultrasonic waves.

In a further embodiment, the coated scintillator particles are ground into a powder following the removal of the first solvent and the further substance.

Another embodiment provides an X-ray detector, gamma detector or UV detector comprising coated scintillator particles as disclosed above.

In a further embodiment, the X-ray detector, gamma detector or UV detector comprises a substrate with a first electrical contact and optionally a first intermediate layer, a layer comprising the coated scintillator particles as disclosed above, optionally a second intermediate layer and a second electrical contact.

Another embodiment provides a method for the production of an X-ray detector, gamma detector or UV detector comprising (a) the provision of a powder comprising coated scintillator particles as disclosed above; (b) the application of the powder to a substrate comprising a first electrical contact and optionally a first intermediate layer; (c) the exertion of pressure to compact the powder; (d) optionally, the application of a second intermediate layer; and (e) the application of a second electrical contact.

In a further embodiment, in Step (c) the substrate is heated before the exertion of the pressure to compact the powder.

In a further embodiment, the exertion of pressure is performed using a stamp or a roller or by isostatic means.

Another embodiment provides a use of coated scintillator particles as disclosed above for detecting high-energy radiation, e.g., UV radiation, gamma radiation and/or X-rays.

BRIEF DESCRIPTION OF THE DRAWINGS

Example aspects and embodiments are described below with reference to the drawings, in which.

DETAILED DESCRIPTION

Embodiments of the present invention provides a scintillator particle that is coated, or sheathed, with a thin coating of photoactive material.

Other embodiments provide a method for the production of coated scintillator particles, wherein at least one photoactive material is dissolved by means of at least one first solvent, the scintillator particles are added to the solution, the coated scintillator particles are then precipitated by adding a further substance and finally the first solvent and the further substance are removed.

Other embodiments provide an X-ray detector, gamma detector or UV detector comprising the coated scintillator particles according to the invention and a method for the production of an X-ray detector, gamma detector or UV detector comprising a) provision of a powder comprising the coated scintillator particles according to the invention;
b) application of the powder to a substrate comprising a first electrical contact and optionally a first intermediate layer;
c) exertion of pressure to compact the powder;
d) optionally, the application of a second intermediate layer; and
e) the application of a second electrical contact.

Other embodiments provide for use of the coated scintillator particles for detecting high-energy radiation, e.g., UV radiation, gamma radiation and/or X-rays.

DETAILED DESCRIPTION OF THE INVENTION

According to a first aspect, the present invention relates to coated scintillator particles, wherein the scintillator particles are each coated with a photoactive material.

According to certain embodiments, the scintillator particle has a diameter of 0.01 to 50 µm, preferably 0.5 to 20 µm, more preferably of 1 to 10 µm. Said diameter can be determined suitably, and hence set, by means of optical methods (for example dynamic light scattering, DLS), electron microscopy or electrical analysis methods (for example a Coulter counter). A reduction in the particle diameter is generally accompanied by a reduction in the emission strength. According to preferred embodiments, the scintillator particles have a diameter of 0.1-30 μm, preferably 1-10 μm, which is matched to the interaction length of high-energy electrons, which are triggered by X-ray quanta. For the detection of UV radiation, the drop is manifested less seriously and therefore here smaller particles with diameters of up to 10 nm diameter are also used.

In certain embodiments, the coating of photoactive material covers the scintillator particle in the coated scintillator particle according to the invention over at least 80%, preferably up to at least 90% and more preferably up to at least 95% of its entire outer surface. According to preferred embodiments, the scintillator particle is completely, i.e. 100%, coated so that the coated scintillator particle is provided with the coating on all sides.

In addition, the coating of the photoactive material according to certain embodiments has a thickness of 15 to 1500 nm, preferably 50 to 1000 nm, more preferably 100 to 1000 nm, particularly preferably 150 to 600 nm.

According to certain embodiments, the maximum thickness of the coating is 2.5 times the penetration depth of the radiation emitted by the scintillator particle so that the maximum distance between two directly adjacent scintillator particles is five times the penetration depth of the radiation emitted by the scintillator particles.

In this case, the penetration depth can be derived from the Beer-Lambert law: $I = I\_0 * \exp(-alpha * d)$
I=transmitted intensity
1_0=initiated intensity
alpha=absorption coefficient
d=layer thickness/penetrated depth of the medium The penetration depth delta is defined as the layer thickness, at which the intensity of the electromagnetic radiation has fallen to 1/e-th part of the initial value and hence the reciprocal value of the wavelength-dependent absorption coefficient.

$$delta = 1/alpha$$

For example, in the case of a P3HT:PCBM donor-acceptor mixture/bulk heterojunction as a photoactive material, the absorption coefficient for green light (wavelength 550 nm) is approximately 7.7e+04 cm-1 corresponding to a penetration depth of delta=130 nm.

To ensure good operating reliability of a detector according to the invention produced with the coated scintillator particles according to the invention, the entire interspace between two particles, which is, for example, also produced by the coating of the scintillator particles, should be excited by means of emitted photons. According to the invention, this is ensured if, for example, the intensity has fallen to 10%. In the example selected, this would be the case at 300 nm so that two particles could be spaced part by as much as 600 nm corresponding to about five times the penetration depth and corresponding to a coating of the coated scintillator particles according to the invention with a thickness of 300 nm. Hence, five times the penetration depth achieves good absorption of the light emitted by the scintillator particles.

According to certain embodiments, the respective distance between two scintillator particles corresponds to less than three times the penetration depth radiation emitted by the particle and hence to a coating of the coated scintillator particles according to the invention with a thickness of less than 1.5 times the penetration depth of the emitted radiation.

According to preferred embodiments, the maximum distance between two scintillator particles is three times the penetration depth of the radiation emitted by the scintillator particles and, according to particularly preferred embodiments, the maximum distance between two scintillator particles is twice the penetration depth of the radiation emitted by the scintillator particles corresponding to a coating of the coated scintillator particles with a maximum thickness of 1.5 times the penetration depth or a maximum thickness of one penetration depth of the radiation emitted by the particles. In such a case (twice the penetration depth), the charge transport in the matrix is efficiently improved by the generation of conductive channels between two adjacent scintillator particles under X-ray excitation. According to certain embodiments, the scintillator particles have a coating thickness embodied such that the conductive zones generated by the emission of the scintillator particles intersect thus enabling the achievement of rapid responsivity, for example in the case of a maximum thickness corresponding to 2.5 times, 1.5 times the penetration depth or one penetration depth of the radiation emitted by the particles.

According to certain embodiments, the photoactive material is an organic photoactive material, but, according to certain embodiments, it can also comprise an inorganic photoactive material or a mixture of an organic and an inorganic photoactive material. The use of an organic photoactive material is preferred. According to certain embodiments, the organic photoactive material can also comprise more than one photoactive material and/or a detector according to the invention can comprise more than one type of coated scintillator particles. According to certain embodiments, the photoactive material is semiconducting. Furthermore, according to certain embodiments, the layer made of the photoactive material is an electrooptically active layer.

According to certain embodiments, the photoactive material is present in the layer in the form of a donor-acceptor mixture. In this case, the donor-acceptor mixture is also referred to as a bulk heterojunction.

A typical representative of a strong electron donor (low electron affinity) is, for example, the conjugated polymer poly(3-hexylthiophene) (P3HT). Typical materials for electron acceptors (high electron affinity) are fullerenes and the derivatives thereof such as, for example, [6,6]-phenylC$_{61}$-butyric acid methyl ester (PCBM). However, it is also possible for materials such as polyphenylenvinylene and the derivatives thereof such as the cyano derivative CN-PPV, MEH-PPV (poly(2-2-ethylhexyloxy)-5-methoxy-p-phenylenevinylene)), CN-MEH-PPV, or phthalocyanine, PEDOT:PSS, TFB (poly(9,9-di-n-octylfluorene-alt(1,4-phenylene((4-sec-butylphenyl)imino)-1,4-phenylene) or poly[(9,9-dioctylfluorenyl-2,7-diyl)-co(4,4'-(N-(p-butylphenyl)) diphenylamine)], etc., to be used. Further exemplary compounds are named below in combination with suitable scintillator particles.

In addition, the photoactive material can also be a perovskite crystal of the type $ABX_3$ and/or $AB_2X_4$, wherein A represents at least one monovalent, divalent or trivalent element from the 4$^{th}$ period and above of the periodic table, preferably, Sn, Ba, Pb, Bi; B represents a monovalent cation whose volume parameter with the respective element A is sufficient for perovskite lattice formation, preferably monovalent, amino-group containing, positively charged carbon compounds, more preferably amidinium ions, guanidinium ions, isothiouronium ions, formamidinium ions, and primary, secondary, tertiary and quaternated organic ammonium ions, particularly preferably with 1 to 10 carbons; and X is selected from the anions of halogenides and pseudohalogenides, preferably from the anions chloride, bromide and iodide and mixtures thereof.

According to the invention, perovskite crystals of the type $ABX_3$ and/or $AB_2X_4$ are not particularly restricted insofar that A represents at least one monovalent, divalent and/or trivalent positively charged element from the $4^{th}$ period and above of the periodic table and/or mixtures thereof, i.e. also the $5^{th}$, $6^{th}$ and $7^{th}$ periods including the lanthanides and actinides, wherein the $4^{th}$ period of the periodic table begins with K and comprises the transition metals from Sc; B represents a monovalent cation whose volume parameter with the respective element A is sufficient for perovskite lattice formation; and X is selected from the anions of halogenides and pseudohalogenides, preferably from the anions chloride, bromide and iodide and mixtures thereof.

According to certain embodiments, A comprises or is a divalent and/or trivalent element from the $4^{th}$ period and above of the periodic table. According to certain embodiments, in the above formulae, A preferably comprises or is Sn, Ba, Pb, Bi or mixtures thereof. The perovskite crystals can also comprise mixtures of different elements from the fourth period and above, i.e. for example two different divalent elements or even a mixture of monovalent and trivalent elements. According to certain embodiments, the perovskite crystals only comprise one element from the $4^{th}$ period and above of the periodic table. In particular, preferably comprised are Sn, Ba and Pb and mixtures thereof, in particular divalent cations of these elements.

B represents a monovalent cation whose volume parameter with the respective element A is sufficient for perovskite lattice formation. In this case, the corresponding volume parameters for perovskite lattice formation are sufficiently well known, both in theory and also, for example, from X-ray crystallography investigations, as are the volume parameters of monovalent cations and the cations defined under A. Hence, following the determination of elements A and possibly C, the corresponding monovalent cation B can be determined suitably, for example using computer models and possibly simple tests. In the above formulae, B preferably represents a monovalent, amino-group-containing, positively charged carbon compound, wherein one carbon compound is a compound comprising at least one carbon atom and hence both organic and inorganic compounds. According to certain embodiments, B is selected from the group consisting of amidinium ions, guanidinium ions, isothiouronium ions, formamidinium ions, and primary, secondary, tertiary and/or quaternated organic ammonium ions, which particularly preferably have 1 to 10 carbon atoms, in particular 1 to 4 carbon atoms, wherein these can be aliphatic, olefinic, cycloaliphatic and/or aromatic carbon linkages. According to certain embodiments, the carbon compound in B is an organic carbon compound.

X is selected from the anions of halogenides and pseudohalogenides and is preferably selected from the anions chloride, bromide and iodide and mixtures thereof. Therefore, it is, for example, also possible for different halogenide ions to be contained in the perovskite crystals, although, according to certain embodiments, only one halogenide ion such as, for example iodide, is contained.

Materials with the general formulae $ABX_3$ and $AB_2X_4$ can in particular crystallize in the perovskite lattice when A is a 2-valent element from the $4^{th}$ period in the PTE, B is an arbitrary monovalent cation whose volume parameter with the respective element A is sufficient for perovskite lattice formation, and X corresponds to the halogenide anions iodide, bromide or chloride or mixtures thereof. According to the invention, the possibility of both perovskite crystals with the general formula $ABX_3$ and the general formula $AB_2X_4$ being are present in the detection layer is not excluded, but it is also possible for only crystals according to one of the two formulae to be present.

Preferably suitable for the perovskite crystals, are the materials mixed in a molar ratio:

There are no particular restrictions on the size and shape of the perovskite crystals. The perovskite crystals can be present in monocrystalline or polycrystalline form. According to certain embodiments, the perovskite crystals are also homogeneous. In addition, the perovskite crystals can also be present as mixed crystals, but preferably no mixed crystals are present.

Hence, also disclosed are coated scintillator particles as a semiconducting photoactive material, wherein the scintillator particles are coated with a coating of perovskite crystals of the type $ABX_3$ and/or $AB_2X_4$, wherein A represents at least a monovalent, divalent or trivalent element from the $4^{th}$ period and above of the periodic table and/or mixtures thereof, preferably, Sn, Ba, Pb, Bi; B represents a monovalent cation whose volume parameter with the respective element A is sufficient for perovskite lattice formation, preferably monovalent, amino-group-containing, positively charged carbon compounds, more preferably amidinium ions, guanidinium ions, isothiouronium ions, formamidinium ions, and primary, secondary, tertiary, and quaternated organic ammonium ions, particularly preferably with 1 to 10 carbons; and X is selected from the anions of halogenides and pseudohalogenides, preferably from the anions chloride, bromide and iodide and mixtures thereof. The scintillator particles are not particularly restricted and in this case can be as described above.

When perovskite crystals are used as a semiconducting photoactive material, the crystalline coating takes over both the absorption of the light emitted by a scintillator and the direct generation of charge carrier pairs and the transport of the separate charge carriers to the corresponding contacts. Therefore, in addition to the scintillators, the perovskites absorb the incoming radiation, for example X-rays, and converts it.

When the scintillator particle is coated with a crystalline coating made of a perovskite-lattice-forming material, which absorbs the incident light generated by a scintillator and conducts charge carriers generated thereby to the contacts, it is possible to achieve a further improvement to the detection in a detector layer. At the same time as the scintillator, the crystalline coating also converts solely X-rays into charge carriers. The combination of two X-ray sensitive materials hereby increases absorption in comparison to two individual layers of scintillator or pure perovskite powder. Here, once again, the structure forms during a synthesis performed in advance and not only during the drying phase on the substrate, as is the case with the previously usual methods for producing perovskite layers.

The sheathing/coating of scintillators with a crystalline coating with a perovskite lattice structure is also in particular a combination of two X-ray active materials so that the absorption of X-rays and their conversion into an electrical signal by the coated particles is improved in comparison with the individual materials (scintillator or pure powder with a perovskite lattice structure).

The photons generated with the use of a scintillator are absorbed in the adjacent perovskite lattice-material and converted into charge carriers. This increase in the charge carriers has positive effects in the perovskite lattice-material in comparison with a pure perovskite lattice because this increases the charge carrier density and hence the conductivity and the detector response times can be reduced so that the detectors become quicker.

According to certain embodiments, the photoactive material is highly resistive in the non-irradiated state of the detector and becomes conductive when irradiated by the detector. This results in an additional signal improvement during detection since it is also possible for the background noise to be minimized.

In this case, the conditions for high resistivity are as follows: in the case of thin diodes, the resistance of the diode in the blocking direction is substantially established by the contact resistance. This ensures that low dark currents are achieved. The use of a, for example organic, photodetector in the context of medical X-ray imaging requires a dark current of not more than 1e-05 mA/cm². With a −1 V cut-off voltage, this corresponds to 1e8 ohm for a detector with an area of 1 cm². With thicker diodes, such as can be present in this case by way of example, the layer resistance starts to become increasingly important. The resistance of the diode then increases then with an increasing layer thickness and it possible to specify a specific resistance. For a layer with a thickness of 100 μm, a dark current of 1e-6 mA/cm² is desirable corresponding to a specific resistance of 1e-11 ohm×cm. Accordingly, for the purposes of the invention, highly resistive preferably means that the specific resistance of the layer corresponds to at least 1e-9 ohm×cm, preferably 1e-11 ohm×cm.

According to certain embodiments, the photoactive material absorbs radiation in a wavelength range in which the scintillator particles emit radiation. According to certain embodiments, the photoactive material also has at least one absorption maximum at a wavelength corresponding to an emission wavelength of the scintillator particle, preferably the emission wavelength of a maximum of the emission of the scintillator particle.

Exemplary combinations of material for a combination of scintillator particles with photoactive organic materials for different wavelengths are described below.

Suitable green scintillators are for example $Gd_2O_2S$:Pr, Ce (gadolinium oxysulfide, doped with praseodymium and cerium with an emission maximum at approximately 515 nm), $Gd_2O_2S$:Tb (gadolinium oxysulfide, doped with terbium with an emission maximum at approximately 545 nm), $Gd_2O_2S$:Pr, Ce,F (gadolinium oxysulfide, doped with praseodymium or cerium or fluorine with an emission maximum at approximately 510 nm), YAG:Ce (yttrium aluminum garnet doped with cerium with an emission maximum at approximately 550 nm), CsI:Tl (cesium iodide, doped with thallium with an emission maximum at approximately 525 nm), $CdI_2$:Eu (europium-doped cadmium iodide with an emission maximum at approximately 580 nm) or $Lu_2O_3$:Tb (lutetium oxide doped with terbium with an emission maximum at approximately 545 nm), are characterized by an emission maximum in the region of 515-580 nm and are well adapted for the absorption maximum of poly(3-hexylthiophene-2,5-diyl) (P3HT) (as an exemplary photoactive material in the organic matrix) at 550 nm and $(CH_3NH_3)PbI_3$ at 450-750 nm. The scintillator $Bi_4Ge_3O_{12}$ or BGO (bismuth germanate with an emission maximum at approximately 480 nm) can be combined effectively with poly[2-methoxy-5-(2-ethylhexyloxy)-1,4-phenylenvinylene] (MEH-PPV) or poly[2-methoxy-5-(3',7'-dimethyloctyloxy)-1,4-phenylenvinylene](MDMO-PPV), which have good absorption in the region of 460-520 nm, or combined with $(CH_3NH_3)BrI_3$ or $(CH_3NH_3)PbI_3$, which have good absorption in the range of 460-510 nm.

Suitable blue scintillators should also be named. One attractive combination of materials with emission in the blue range is $Lu_2SiO_5$:Ce or LSO (cesium-doped lutetium oxyorthosilicate with an emission maximum at approximately 420 nm), $Lu_{1.8}Y_{.2}SIO_5$:Ce (with cerium-doped lutetium oxyorthosilicate with an emission maximum at approximately 420 nm), $CdWO_4$ (cadmium tungstate with an emission maximum at approximately 475 nm), CsI:Na (cesium iodide doped with sodium with an emission maximum at approximately 420 nm), or NaI:Tl (thallium-doped sodium iodide with an emission maximum at approximately 415 nm), $Bi_4Ge_3O_{12}$ or BGO (bismuth germanate with an emission maximum at approximately 480 nm), $Gd_2SiO_5$ or GSO (gadolinium oxyorthosilicate doped with cerium with an emission maximum at approximately 440 nm), or CsBr:Eu (cesium bromide doped with europium with an emission maximum at approximately 445 nm), which can be combined effectively with typical wide-band gap semiconductors (semiconductors with a wide band gap) such as poly [(9,9-di-n-octylfluorenyl-2,7-diyl)-alt(benzo[2,1,3] thiadiazol-4,8-diyl)](F8BT) (absorption maximum at 460 nm) or other polyfluorene(PFO) polymers and copolymers (absorption at 380-460 nm) or the aforementioned perovskites.

Red scintillators such as $Lu_2O_3$:Eu (lutetium oxide doped with europium with an emission maximum at approximately 610-625 nm), $Lu_2O_3$:Tb (lutetium oxide doped with terbium with an emission maximum at approximately 610-625 nm) or $Gd_2O_3$:Eu (gadolinium oxysulfide doped with europium with an emission maximum at approximately 610-625 nm), YGdO:(Eu,Pr) (europium and/or praseodymium doped yttrium gadolinium oxide with an emission maximum at approximately 610 nm), GdGaO:Cr,Ce (chromium and (or cesium-doped gadolinium gallium oxide), or CuI (copper iodide with an emission maximum at approximately 720 nm) can be effectively combined with absorbers, such as those developed for OPV (organic photovoltaics), for example poly[2,1-3-benzothiadiazole-4,7-diyl[4,4-to(2-ethylhexyl)-4H-cyclopenta[2,1-b:3,4-b']dithiophene-2,6-diyl]] (PCPDTBT), squaraines (for example hydrazone end-capped symmetrical squaraines with glycolic functionalization or diazulene squaraines), polythieno[3,4-b]thiophene (PTT), poly(5,7-bis(4-decanyl-2-thienyl)-thieno(3,4-b) diathiazolthiophen-2,5) (PDDTT), or can also be combined effectively with $(CH_3NH_3)PbI_3$.

According to preferred embodiments of these pairs, the following should be particularly highlighted: Gd2O2S:Tb or YAG:Ce in combination with P3HT:PCBM, Lu2SiO5:Ce in combination with F8BT or YGdO:Eu with PCPDTBT, and Gd2O2S:Tb or YAG:Ce in combination with $(CH_3NH_3)PbI_3$ or $(CH_3NH_3)BrI_3$, Lu2SiO5:Ce in combination with $CH_3NH_3)PbI_3$ or $(CH_3NH_3)BrI_3$ or YGdO:Eu with $CH_3NH_3)PbI3$.

Figure 15:
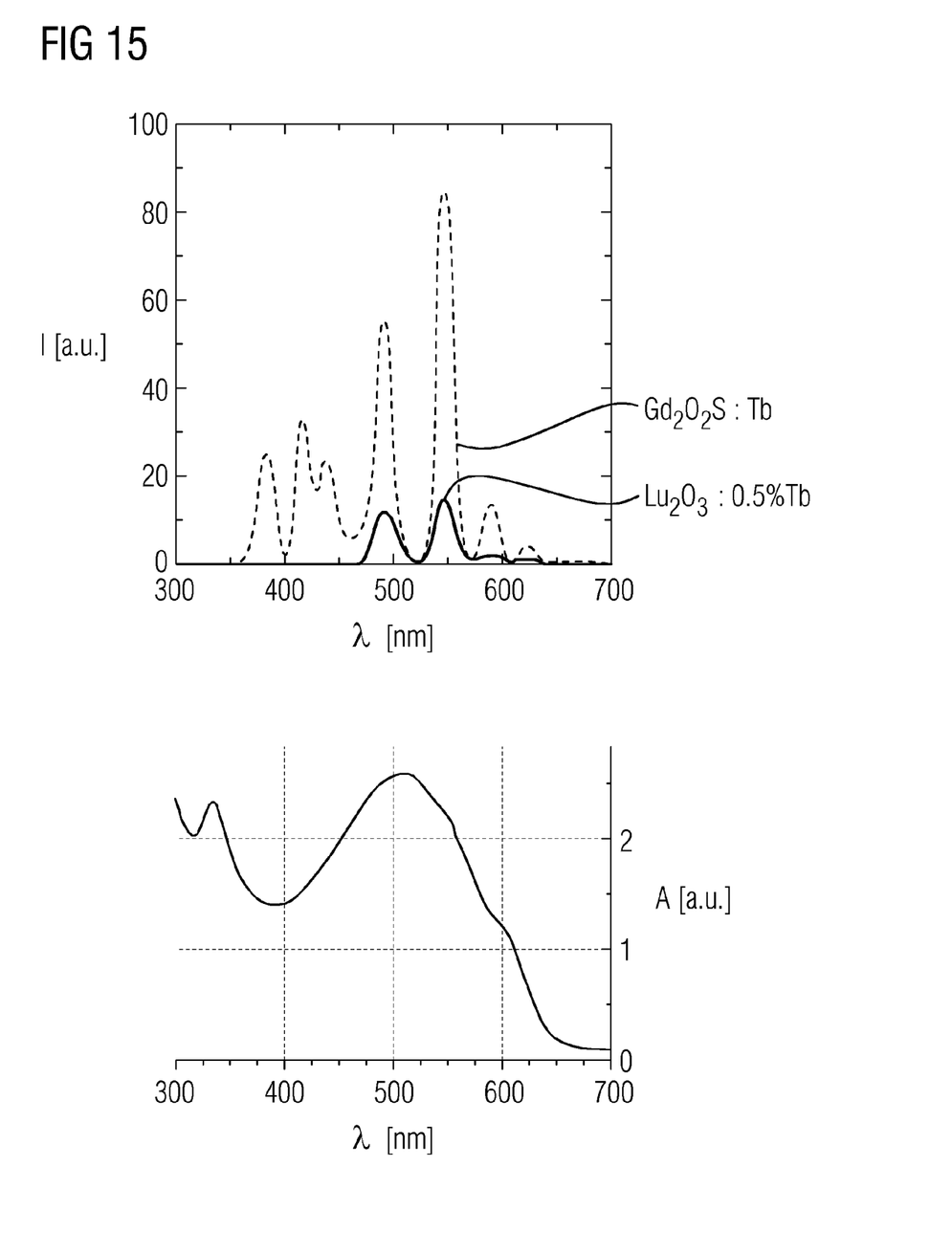
FIG. 15 shows by way of example the matching of the emission of scintillator particles to the absorption of the organic matrix.

An exemplary matching/adaptation of the scintillator emission (for example GOS or $Lu_2O_3$:Tb, green) to the polymer absorption (for example P3HT) is shown in FIG. 15, wherein the adaptation can be clearly seen from the emission spectrum of the scintillators (left) and the absorptions spectrum of the organic matrix (right).

One special aspect of the present invention is the sheathing of the scintillator particle with a coating made of photoactive material. In known methods, for embedding particles in a semiconductor matrix, the structure formation only takes place during the drying process. The particles and the photoactive material, for example an organic semiconductor, are applied simultaneously to a substrate from the liquid phase. The structure forms during the drying.

Figure 2:
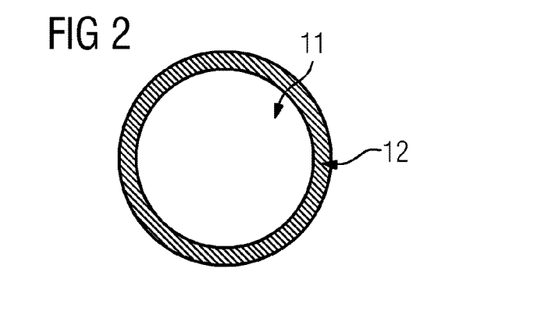
FIG. 2 is a schematic view of an exemplary coated scintillator particle according to an embodiment.

According to the invention, therefore, a material is comprised, for example, with which the one scintillator particle is enclosed by an organic photoactive and electrically active coating. FIG. 2 shows an exemplary coated scintillator particle with the scintillator particle 11, for example Gd2O2S:Tb, which emits green light under X-ray excitation in the sheathing/coating of the photoactive material 12, for example coated with a coating made of a so-called bulk heterojunction (BHJ), for example consisting of P3HT and PCBM. Here, the BHJ is characterized for example in that its absorption properties are matched to the emission of the scintillator particle, for example, P3HT has an absorption maximum in the green range. The mixture of an electron acceptor (P3HT) and an electron donor (PCBM) ensures that excitons, which are generated by the absorption of a photon, are separated very quickly and the probability of recombination is minimized.

The size of the scintillator particle is set such that it is adapted to the physical mechanisms of interaction. For example, in the field of medical X-ray imaging, X-ray energy of between 10 and 150 keV is generally used. In this energy range, the photoelectric effect is dominant in the X-ray absorption process, i.e. the absorption of an X-ray quant causes a high-energy electron to be deflected out of the atomic union and to move within the scintillator crystal. In multiple collision processes, this high-energy electron generates excited states in the scintillator crystal, which generate visible light by means of recombination. The range of the high-energy electron typically lies within the region of a few μm; accordingly, for example a particle diameter of 1-10 μm, for example, represents a good starting base. In smaller particles, a part of the kinetic energy of the photoelectron could be lost; larger particles are conceivable from optical viewpoints, but these limit the electrical efficiency of later components. The thickness of the BHJ coating is also adapted to the photon absorption length. The absorption length of green light in P3HT is typically 250 nm-500 nm; a much thicker covering would not improve the absorption properties. The above considerations are also similarly applicable to the detection of gamma rays or UV light.

Hence, according to a further aspect, the present invention relates to a method for the production of coated scintillator particles, wherein at least one photoactive material is dissolved by means of at least one first solvent, the scintillator particles are added to the solution, the coated scintillator particles are then precipitated by adding a further substance and finally the first solvent and the further substance are removed.

During the production of the coated scintillator particles, according to certain embodiments, it is possible for the at least one photoactive material or a mixture of photoactive materials, for example two photoactive materials, to be dissolved by means of at least one first solvent, the scintillator particles to be added to the solution, then the coated scintillator particles to be precipitated by adding a further substance, for example a further liquid, and finally the at least first solvent and the further substance are removed, for example by suction, filtering or evaporating the solvents, etc. Here, there is no restriction on suitable substances for the dissolving and precipitation and they can be selected as suitable for the purpose of the application and also include mixtures. For example, when P3HT and PCBM are used, chloroform can be used as a solvent and ethanol as a precipitating reagent.

According to certain embodiments, the scintillator particles are not soluble in the first solvent. According to further certain embodiments, the photoactive material comprises at least two organic compounds. In preferred embodiments, the suspension of the scintillator particles is continually mixed/agitated during processing. This can, for example, be achieved by exposing the suspension to ultrasonic waves in order to ensure better distribution of the scintillator particles.

However, the invention does not exclude the possibility of the scintillator particles agglomerating during the precipitation being obtained as a bulky mass since in this case, sheathed, coated scintillator particles will still be obtained. However, according to certain embodiments, the coated scintillator particles can also be obtained individually and this can be controlled, for example, via the concentrations of the reagents used in solution or suspension.

According to the invention, in the production method for the coated scintillator particles according to the invention, it is also possible, for example, to use dispersing agents, ligands for the scintillator particles or further additives, which can then, for example using ultrasound, be removed again from the surface of the scintillator particles before precipitation. According to certain embodiments, no additives are added in order to avoid a negative influence on the organic semiconductor materials.

According to certain embodiments, the coated scintillator particles are ground into a powder following the removal of the first solvent and the further substance. In this case, according to certain embodiments, care is taken to ensure that only coherent coated particles are separated and the coating of the coated particles is not attacked, which can be achieved, for example, by the choice of a suitable grinding method, for example wet grinding and subsequent drying. However, it is usually sufficient simply to pulverize the particle mass obtained after the separation of the solvent in a mortar to produce a free-flowing, homogeneous powder.

According to certain embodiments, the powder comprises powder granules with a diameter of 0.01 to 200 μm, preferably 0.5 to 100 μm and particularly preferably 1 to 10 μm. Powder granules that too big can complicate compaction during the production of detectors according to the invention, while powder granules that are too small can make the method too cumbersome. The best results are obtained with particle granules with a diameter of 1 to 10 μm, wherein the particle diameter can be determined for example using optical (high-resolution microscope, dynamic light scattering/DLS), electron microscope or electrical analyses (for example a Coulter counter).

In the method according to the invention, the structure is already formed in solution. This enables better control of the use of the material and new possibilities are obtained for processing from the dry phase. The method is also characterized by good processing properties during the production of thick layers in detectors (no drying cracks due to escaping solvent), and the associated health and environmental benefits.

Figure 3:
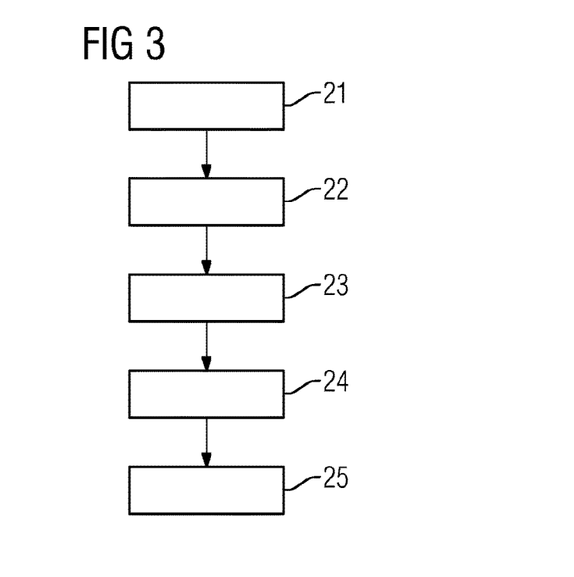
FIG. 3 is a schematic view of a method for the production of a coated scintillator particle according to an embodiment.

The production of the coated scintillator particles can, for example, take place using the processes depicted in FIG. 3. First, the photoactive material, for example organic semiconductor materials, is dissolved in at least one first solvent in Step 21. Then, the scintillators are added in Step 22 and, for example, dispersed under continuous stirring. Optionally, ultrasound treatment can be used to disintegrate agglomeration of the starting materials. In this case, it is not necessary for the scintillators to be surrounded by a ligand coat since the stirring ensures that the particles are distributed. The addition of a second solvent in Step 23, in which the photoactive material, for example the organic semiconductor, is not soluble, the desired material is precipitated (Step 24). In this case, the scintillator particles function as condensation nuclei around which the organic semiconductor material accumulates. Then, the solvent can be separated out in Step 25, for example stripped off, and the material used as powder for the production of a component.

The quantities to be used for the production of coated scintillator particles can be derived using the following considerations, for example.

Desired coat thickness and required quantities:

The total volume of an exemplary hybrid photodiode is made up of the scintillator granule $V_{Scintillator}$ and the sheath volume of the bulk heterojunction $V_{BHJ}$ (organic matrix). In order to be able to weigh out the optimum ratio, the densities of the photoactive material, for example of bulk heterojunction $P_{BHJ}$, and of the scintillator $P_{Scintillator}$, are required in order to arrive at the respective weight $W_{BHJ}$ and $W_{Scintillator}$.

Total volume ($V_{Gesamt}$) of the hybrid photodiode:

$$V_{Gesamt} = V_{BHJ} + V_{Scintillator} = \frac{W_{BHJ}}{\rho_{BHJ}} + \frac{W_{Scintillator}}{\rho_{Scintillator}}$$

To elucidate the significant sizes of the ratio of the volumes and the quantities, this is expressed as a percentage volume and percentage quantity in comparison with the total volume and quantity. This is reflected in the following two formulae.

Percentage volume of the BHJ $V_{BHJ}\%$:

$$V_{BHJ}\% = 100 \cdot \frac{V_{BHJ}}{V_{Gesamt}}$$

Percentage quantity of the BHJ ($W_{BHJ}\%$):

$$W_{BHJ}\% = 100 \cdot \frac{W_{BHJ}}{W_{Scintillator} + W_{BHJ}}$$

The desired sheath volume is obtained from the desired absorption of the bulk heterojunction. The absorption can be set via the layer thickness $r_{BHJ}$ of the sheath volume and consequently via the absorption length of the emitted light. The sheath volume is made up of the total volume with the radii $r_{Scintillator}$ and $r_{BHJ}$ minus the internal sphere, the scintillator. This can be calculated as follows.

Desired sheath volume ($V_{BHJ}$) and thickness ($r_{BHJ}$):

$$V_{BHJ} = \frac{4\pi}{3}((r_{Scintillator} + r_{BHJ})^3 - (r_{Scintillator})^3)$$

One example of a scintillator with a radius $r_{Scintillator}=1.8$ µm and a desired sheath absorption layer thickness of $r_{BHJ}=0.15$ µm is an optimum filling factor $V_{BHJ}\%$:$V_{Scintillator}\%$ of 37%:63%. With typical densities of $P_{BHJ}=1.2$ g/ml and $P_{Scintillator}=7.2$ g/ml, this produces a weight ratio $W_{BHJ}$:$W_{Scintillator}$ of approximately 1:10.

Here, it should in particular be mentioned that this mass ratio is dependent upon the diameter of the scintillator and the density thereof. The larger the particle, the smaller the amount of photoactive material required to meet the conditions named above.

The volume ratios are defined by the diameter of the scintillators and the penetration depth of the light into the photoactive material. The density can then be used to calculate the mass ratio according to the above formulae. For example, for a 2 µm Gd2O2S particle with a penetration depth of 130 nm, the optimum mass ratio is approximately 1:14, while, for a 10 µm particle, the mass ratio increases to 1:75.

According to a further aspect, the present invention relates to an X-ray detector, gamma detector or UV detector comprising the coated scintillator particles according to the invention.

According to certain embodiments, the X-ray detector, gamma detector or UV detector comprises a substrate with a first electrical contact and optionally a first intermediate layer, a layer comprising the coated scintillator particles according to the invention, optionally a second intermediate layer and a second electrical contact.

With the method according to the invention, the substrate is not particularly restricted and can comprise all substrates that are usually used in X-ray detectors, gamma detectors or UV detectors. For example, it can comprise glass, indium tin oxide (ITO), aluminum tin oxide, doped tin oxides, silicon, etc. According to certain embodiments, the substrate can comprise a first electrical contact such as a metal, for example Cu, Ag, Pd, Pt, Cr, Au or Al, ITO, aluminum tin oxide, doped tin oxides, etc., and optionally a first intermediate layer such as those found, for example, in electroorganic components. In this case, the electrode and/or substrate material is determined by whether the use is as an X-ray detector, gamma detector or UV detector, wherein different materials are used for the detection of these different types of radiation, since, for example, in certain embodiments they are required to be transparent to radiation. Thus, for example, Al is not suitable for UV.

According to certain embodiments, the electrode and/or substrate material reflects the light emitted by the scintillator particles. The reflecting effect of the contacts on the emitted radiation can be achieved in that emitted light does not escape from the active zone. Hence, according to certain embodiments, the first electrical contact and/or the second electrical contact and/or the substrate comprise or consist of a material which reflects the emitted radiation from the scintillator particles. Here, metals such as Au, Ag, Pd, Pt, Al, Cr or Cu are named by way of example, but numerous further materials are known so that the materials of the electrical contacts are not further restricted so they reflect the emitted radiation from scintillator particles. The corresponding embodiment enables the detected signal of the detector to be further improved.

In certain embodiments, the detector according to the invention can optionally contain intermediate layers/interlayers, which improve the transition between the active layer and the contact layers and hence the contacting of the sample. These interlayers are as a rule hole-conducting organic semiconductor or electron-conducting organic semiconductors. The hole conductors used can, for example, be PEDOT:PSS, P3HT, MDMO-PPV, MEH-PPV, TFB, while PCBM can be used as electron conductors. For example, it is also possible to use inorganic interlayers such as, for example, ZnO or TiO.

According to a further aspect, the present invention comprises a method for the production of an X-ray detector, gamma detector or UV detector comprising
a) the provision of a powder comprising the coated scintillator particles according to the invention;
b) the application of the powder to a substrate comprising a first electrical contact and optionally at least a first intermediate layer;
c) the exertion of pressure to compact the powder;
d) optionally, the application of at least one second intermediate layer; and
e) application of a second electrical contact.

With the method according to the invention for the production of an X-ray detector, gamma detector or UV detector, it is possible to reduce the material loss to a minimum in comparison with methods such as spraying or centrifuging. Pressure can also be used to vary the density of the sintered layer. This is in particular a special parameter when considering X-ray absorbing layers. This sintering method enables much higher densities to be achieved in comparison with spraying, centrifuging or knife application, which has a positive effect on the required layer thickness. The thinner the layer, the lower the voltage that needs to be applied to achieve a certain electric field strength. In addition, denser layers, for example, have higher X-ray absorption and improved electrical conductivity.

In this case, according to certain embodiments, the substance to be processed comprising the coated scintillator particles according to the invention as powder, preferably as dry powder, is applied to the respective base/substrate to be coated and then compacted under the exertion of pressure, for example with a stamp, a roller, etc. at a specific sintering temperature, for example including a room temperature of 20-25° C., and sintering time. In this case, the particles of the starting material and the pore spaces are filled. Both solid-phase sintering, i.e. material compaction without melting the powder with the coated scintillator particles according to the invention, and liquid-phase sintering i.e. material compaction by means of melting the powder (for example directly on the contact surface between the sinter stamp and the organic surface), are conceivable. The compaction of the molecules by means of pressure and possibly temperature minimizes and compacts the interspaces in such a way that the application of electric voltage enables electric charge transport, for example by means of hopping or redox processes, between the individual molecules or polymer strands. In this way, homogeneous organic material layers with a higher (and also lower) layer thickness can be implemented without complex vacuum process techniques with a high throughput and without health risks from any possible solvents.

The exertion of pressure is not particularly restricted according to the invention and can be achieved by means of suitable devices. According to preferred embodiments, the pressure is exerted unidirectionally, for example by the use of a stamp or a roller, which are preferably coated with a non-stick coating, for example Teflon®, or by isostatic means, for example by a pressurized liquid (for example oil). Coating with an anti-stick coating, for example Teflon®, in particular enables very homogeneous surfaces of the layer to be achieved. Moreover, the use of stamps and/or rollers is simple to implement from a technical viewpoint. The material used for the stamp or roller is not particularly restricted and can, for example, comprise aluminum, steel, PVC or Teflon®. According to certain embodiments, the pressure is exerted isostatically by means of a pressurized liquid (for example oil) which can improve the ease of processing.

The pressure exerted is not particularly restricted as long as sintering is effected. According to certain embodiments, a pressure of from 0.1 to 10,000 MPa, more preferably 0.5 to 200 MPa and particularly preferably of from 1 to 50 MPa is exerted. Neither is the sintering time particularly restricted and, according to certain embodiments, is from 0.1 s to 60 min, preferably 1 s to 30 min and particularly preferably 5 to 10 min. An overlong sintering time does not achieve better results and can result in a deterioration of the layer, while overshort sintering times are unable to achieve baking of the layer.

According to certain embodiments, the substrate can be heated in Step c) before the exertion of the pressure to compact the powder, for example to a temperature of from 30 to 300° C., preferably 50 to 200° C. This can improve the sintering process.

The layers produced according to the invention can be identified and characterized according to the morphology and surface finish of the sintered layer (possibly in isolation or as whole molten regions). It may also be possible indirectly to draw conclusions regarding a sintering process, for example from the absence of traces of solvent, additives and dispersants. Possible investigative methods include: optical microscopy, scanning electron microscopy, atomic force microscopy, secondary ion mass spectroscopy, gas chromatography, cyclic voltametry, etc.

With the method according to the invention for the production of an X-ray detector, gamma detector or UV detector, the substrate is not particularly restricted and can comprise all substrates usually used in organic components. For example, it can comprise glass, indium tin oxide (ITO), aluminum tin oxide, doped tin oxides, silicon, etc. According to certain embodiments, the substrate can comprise a first electrical contact, such as a metal, for example Cu or Al, ITO, aluminum tin oxide, doped tin oxides, etc., and optionally at least one first intermediate layer, such as for example those present in electroorganic components.

According to certain embodiments, additional photoactive material can be added to the coated scintillator particles before the exertion of pressure or the sintering in order to enable better filling of the pore spaces between the coated scintillator particles. In certain embodiments, it is for example possible to add further components, such as a secondary donor polymer of the p-type.

In this case, in the method according to the invention for the production of an X-ray detector, gamma detector or UV detector according to certain embodiments, the coated scintillator particle are provided as powder, wherein the powder according to the invention is not further restricted. The powder is preferably provided as dry powder, wherein, according to certain embodiments, it can also be mixed with a little solvent, for example with less than 10% by weight, or less than 5% by weight based on the mass of the powder. If the powder is mixed with a little solvent, it can be become tacky, which can facilitate its processing, for example during application to the substrate, and hence it is possible that this will mean that less heating of the substrate is required.

According to certain embodiments, the powder comprising the coated scintillator particles according to the invention consists of powder granules with a diameter of 0.01 to 200 µm, preferably 0.5 to 100 µm and particularly preferably 1 to 10 µm. Oversize powder granules can complicate compaction while undersize powder granules can complicate processing. The best results are obtained with particle granules with a diameter of 1 to 10 μm, wherein the particle diameter can, for example, be determined by means of sieve analysis and corresponding sieves with holes of from 1 and 10 μm can be used.

Following the production of the layer in Step b) and/or c), optionally at least one second intermediate layer can be applied in Step d) and then a second electric contact (metal such as Al, Cu or ITO, aluminum tin oxide, doped tin oxides, etc.) in Step e) and preferably co-sintered. Alternatively, it is also optionally possible to apply a second intermediate layer and then a second electric contact by means of other method steps, such as, for example deposition, spraying, etc. It is also possible for the second electrical contact to be applied by adhesion, for example as solid layer. In addition, the second electrical contact can also serve as a new underlayer/new substrate on to which a new layer can be applied, once again with the method according to the invention. Hence, multilayer structures are also conceivable according to the invention. It is also possible for a layer comprising the coated scintillator particles according to the invention to be applied to a layer comprising other types of coated scintillator particles according to the invention so that here once again multilayers can form, which can be sintered separately from one another or even together.

According to alternative embodiments, it is also possible for the layer comprising the coated scintillator particles according to the invention to be applied on a substrate that does not contain any electrode material, such as, for example, glass, and electrical contacts can then be applied to the side of the powder in Step b) or the compacted powder in Step c), i.e. for example also to the substrate next to the layer.

According to the invention, the area of the layer comprising the coated scintillator particles according to the invention is adapted to the application and for applications in human medicine is, for example, between 2×2 cm$^2$ (for example for dental images), 20×20 cm$^2$ (for example for mammography) up to 43×43 cm$^2$ (for example for pulmonary images). For applications in industrial metrology or veterinary medicine, the area of the detectors can also be smaller or larger.

In order to be able to localize the layer more precisely on the substrate, the application of the powder can be restricted locally according to certain embodiments, for example using a frame, more preferably using a frame coated, at least on the internal side, with a non-stick coating-coating, for example Teflon®. Here, the shape of the frame is not particularly restricted and be round/annular, oval, square, rectangular or have another shape. Neither is the height of the frame further restricted, but it can preferably have the same height as the thickness of the layer to be produced by the method according to the invention or a greater height. For example, according to certain embodiments, after production, the layer can have a thickness of at least 1 μm, preferably at least 10 μm and more preferably at least 100 μm. Toward the top, the thickness of the layer depends upon the intended application, but can, according to certain embodiments, also be several 100 μm (for example X-ray detectors) or more. The material of the frame is not particularly restricted and can, for example, comprise aluminum, steel, PVC or Teflon®.

Figure 4:
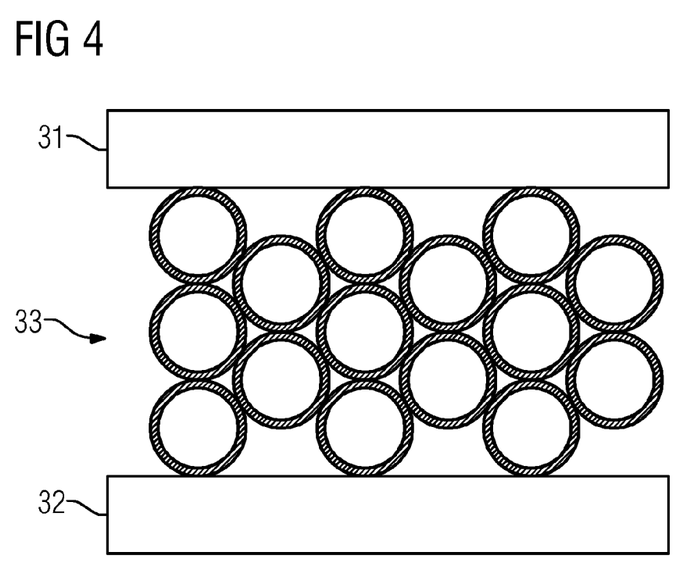
FIG. 4 is a schematic view of an exemplary X-ray detector according to an embodiment.
Figure 5:
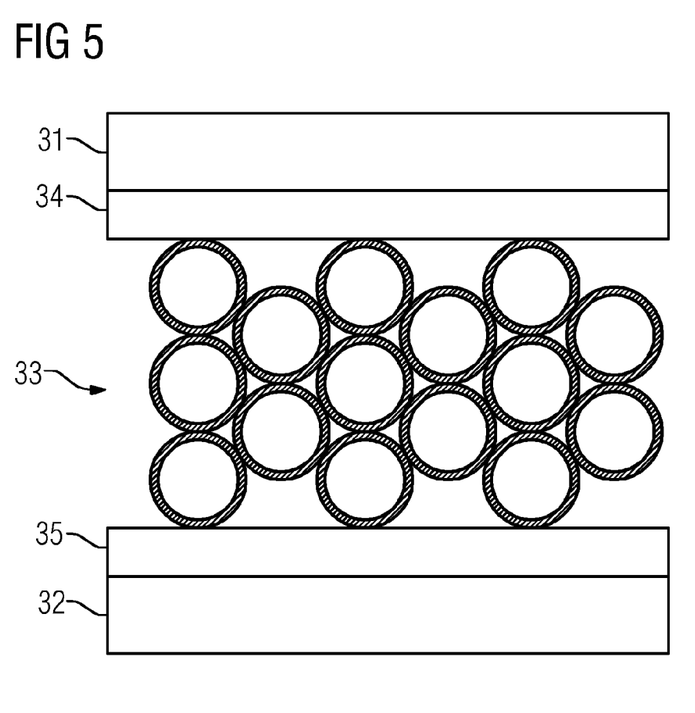
FIG. 5 shows a further exemplary X-ray detector according to an embodiment.

During the sintering of the coated scintillator particles according to the invention, contact with the individual powder granules causes current paths to form on which the photogenerated charge carriers can be dissipated to the contacts and can be identified as photo flux (or "X-ray current"), such as is, for example, depicted in FIG. 4, wherein 31 and 32 depict electrodes (for example Al and ITO or another material) and 33 depicts the coated scintillator particles. FIG. 5 depicts another embodiment of an exemplary X-ray sensitive, gamma sensitive or UV sensitive component. Here, another two additional interlayers 34, 35 are inserted between the contacts and the sintered layer. These have the function of reducing the injection of charge carriers from the electrodes into the sintered layer and hence of facilitating a low leakage current (dark current). These interlayers are generally hole-conducting organic semiconductors or electron-conducting organic semiconductors. The hole conductors used can, for example, be PEDOT:PSS, P3HT, MDMO-PPV, MEH-PPV, TFB, while PCBM can be used as electron conductors. Neither are inorganic interlayers excluded, such as, for example, ZnO or TiO.

Figure 6:
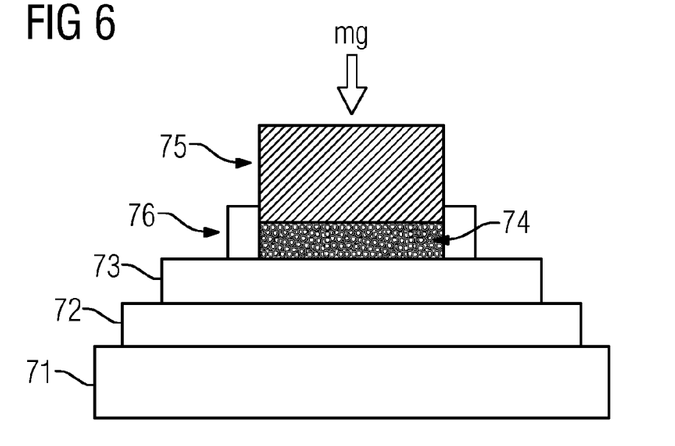
FIGS. 6 and 7 are schematic views of two exemplary steps for the compaction of powder during the production of X-ray, gamma or UV detectors.
Figure 7:
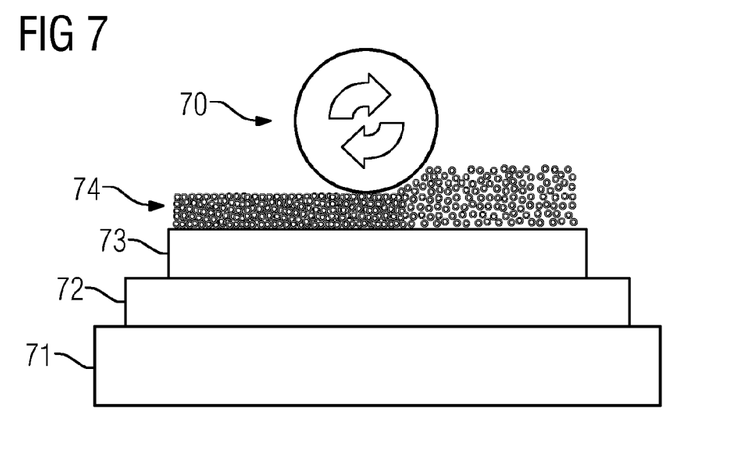

The sintering can be performed by means of stamping (see FIG. 6) or rolling (see FIG. 7), wherein the substrate 72 is applied to a hot plate 71, a lower electrode 73, for example ITO, Au, Cr, Cu, Ag, Pt is placed on this and the layer of coated scintillator particles 74 placed on this. In FIG. 6, the pressure mg is applied via a pressure mold 75, which fits into a filling ring/frame 76, wherein the pressure mold can optionally be heated. In the case of rolling with a roller 70 shown in FIG. 7, which can also optionally be heated, the speed, temperature and pressure are the more important parameters. Before rolling, the free-flowing semiconductor material comprising the coated scintillator particles can be applied dry in homogeneous layers to the substrate in a corresponding greater thickness homogeneously, for example by means of a knife. In the case of stamping shown in FIG. 6, the temperature, the pressure and the time are the decisive parameters.

Figure 8:
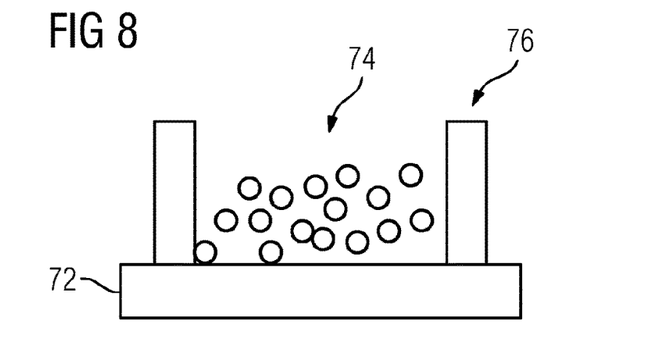
FIG. 8 shows powder comprising coated scintillator particles before compaction in the sintering apparatus.
Figure 9:
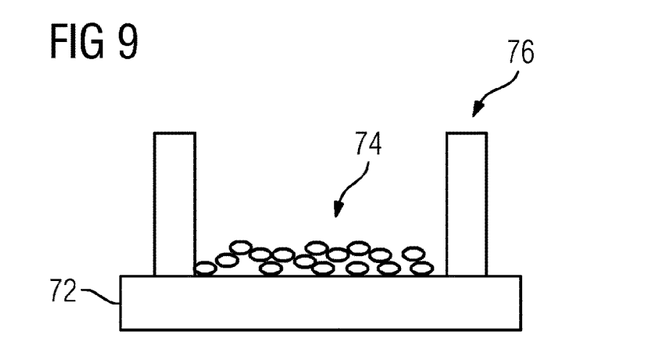
FIG. 9 shows the compacted powder comprising coated scintillator particles.

FIGS. 8 and 9 show the mechanism of sintering in a microscopic view. In FIG. 8, the uncompacted powder of the coated scintillator particles 74 is fed into filling ring 76 on the substrate 72. There is a large distance between the powder particles and there is not necessarily continuous contact. FIG. 9 shows the sintered layer of coated scintillator particles 74 after compaction under pressure and temperature. The particles are in contact and are deformed by melting and pressing.

Figure 10:
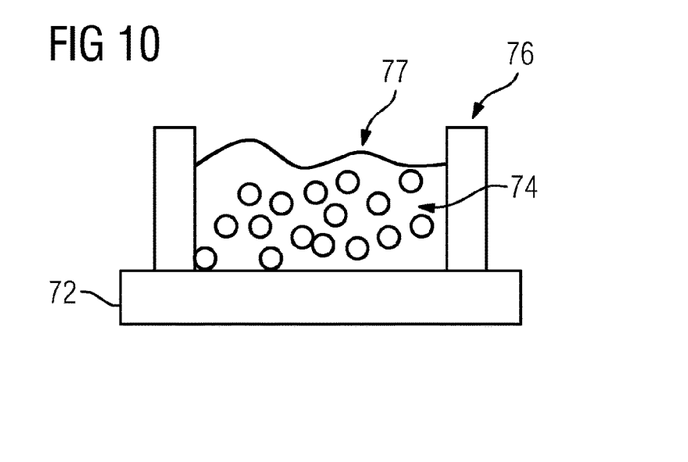
FIG. 10 shows the application of an aluminum foil as a contact layer before compaction.

Following sintering, for example, an aluminum cathode (layer thickness approximately 200 nm) is deposited on the sintered layer by means of physical vapor deposition. Alternatively, it has been demonstrated that it is possible to introduce an aluminum foil blank to be introduced as a top contact/upper electrode 77 as early as the sintering process (see FIG. 10).

Figure 11:
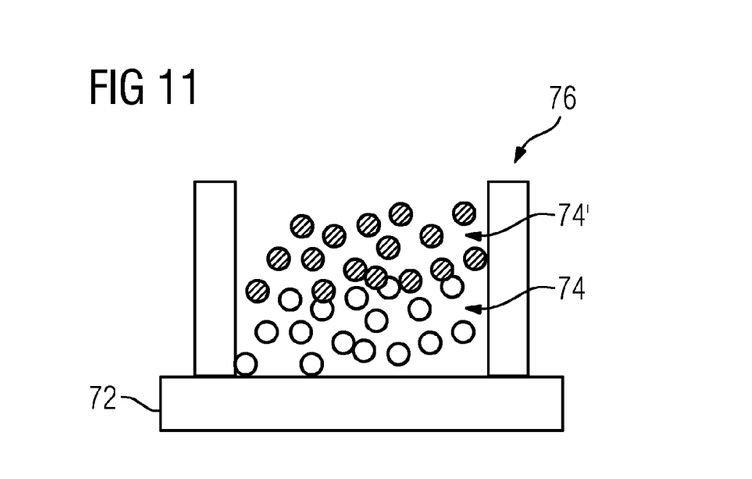
FIG. 11 shows the layering of a plurality of powders comprising coated scintillator particles before compaction.

A further alternative for the application of a second contact or a second layer is shown in FIG. 11. In this case, two different powders of the coated scintillator particles 74 and 74' are layered and pressed together.

Figure 12:
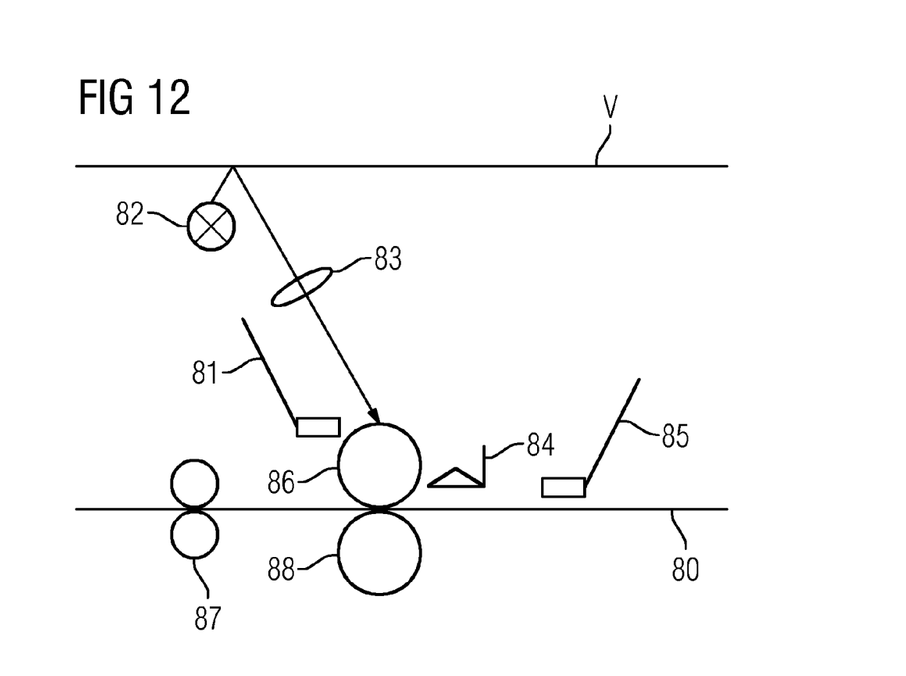
FIG. 12 is a schematic view of a further design of a sintering apparatus for the compaction of powder comprising coated scintillator particles.

FIG. 12 shows a further embodiment of a "sintering machine" for a roll-to-roll process. This is a "heatable roll mill". In principle, there are already machines providing a function of this kind, for example in the form of electrophotographic machines (copiers and laser printers) which can be adapted appropriately for the method according to the invention. FIG. 12 is a schematic sketch of a copier, which would be suitable for the production sintered layers of this kind on flexible substrates 80 if the cartridge 84 is filled with a material with the described coated scintillator particles. In this case, the image drum 86 is electrostatically charged by the charging device 81, light from a light source 82 is reflected by the template V depicting the structure it is desired to be depicted, as with copying and irradiated via the lens 83 onto the image drum 86 and hence correspondingly image regions are depicted on the image drum 86 by clearing the charge with the reflected light. The material with the described coated scintillator particles is now applied to the image drum 86 by means of the cartridge 83 and onto the substrate 80 charged by the application device 85, wherein the substrate 80 is guided through the image drum 86 and counter roll 88. Heated rolls 87 are provided as a fixing unit, which, for example, sinter the material at 140-180° C. All materials in the sintering process according to the invention are electrostatically active and can be applied from (toners) cartridges. It is also possible for electrodes to be applied in this way.

For non-flexible substrates, an adequate arrangement of the copier modules can be provided by a linear substrate transport.

Hence, the production and efficient preparation of (organic) layer systems can be performed by R2R processes (for example passing the substrates through a sintering cascade several times).

According to a further aspect, the present invention relates to the use of the coated scintillator particles according to the invention for detecting high-energy radiation, in particular UV radiation, gamma and/or X-rays.

When advisable, the above embodiments, variants and developments can be combined with one another as desired. Further possible embodiments, developments and implementations of the invention also include not explicitly named combinations of features of the invention described above or below with reference to the exemplary embodiments. In particular, the person skilled in the art will also be able to add individual aspects as improvements or additions to the respective basic shape of the present invention.

Examples

The invention will now be described with reference to a few exemplary embodiments but which do not restrict the invention.

Typical components, electrical characterization and X-ray sensitivity:

A typical X-ray detector according to the invention is based on the principle shown in FIG. 4. For the suggested material in FIG. 4, a combination of scintillator particle Gd2O2S:Tb (GOS) coated by a photoactive and electrically active BHJ coating consisting of P3HT and PCBM as coated scintillator particles 33 is presented as an exemplary embodiment. In this case, the BHJ layer is restricted by an ITO anode with a thickness of approximately 100 nm as an electrode 31 and an Al cathode deposited by means of thermal deposition as an electrode 32. The layer thickness of the Al cathode is approximately 250 nm. The active diode surface is 1 mm$^2$.

Details of the Synthesis:

Production of sintered layers consisting of materials of a BHJ and a scintillator material divided into 2 independent process steps. Production of a powder made of P3HT/PCBM/GOS for sintered layers:

First, the production of a homogeneously distributed particulate powder from the materials required for the layer formation in a chemical laboratory is outlined.

All materials and solvents are cleaned and prepared under the exclusion of oxygen in a glove box or under adequate conditions and similarly all the work until the manufactured, ready-to-use mixture of materials is obtained is performed under such conditions.

To this end, P3HT and PCBM are dissolved in the same mass ratio in chloroform in a round-bottomed flask. During the treatment of the solution of this mixture in an ultrasound tub, GOS particles (diameter approximately 5 µm, determined by a Coulter counter and microscopically) are then added in 4 times the mass ratio (based on the BHJ). This causes the insoluble GOS particles to be held in an optimum distribution in the mixture. When this situation is achieved, ultrasound is performed and approximately 1.5 times volume of ethanol mixed into the mixture subjected to ultrasound. The addition of ethanol results in the immediate formation of homogeneous mixing particles with an extremely fine composition, which settle out slowly when the ultrasound is switched off.

The round-bottomed flask is now connected to a vacuum rotation evaporator with inert gas purging so that, at the bath temperature set, the majority of the chloroform is removed from the mixture (approximately 30° C.).

The residual ethanol particle suspension is now drawn off by means of a Schlenk frit and rinsed numerous times with ethanol and dried in the inert gas flow. The yields are virtually quantitative.

Before the further processing of the semiconductor material obtained, it is finely ground in the inert gas either in a mortar or in a vibratory ball mill. This after-treatment only serves for the formation of a free-flowing powder after the drying of the frit content.

Performance of the Sintering/Production of the Device:

In order to obtain an organic X-ray photodiode with a sintered P3HT/PCBM/scintillator layer, the active area of an ITO anode structure (for example structured ITO glass) is now coated with the free-flowing P3HT/PCBM/GOS-powder. In order to set specific layer thicknesses and define the area to be sintered precisely, a filling ring with a diameter which is approximately 100 µm larger than that of the pressure mold (sinter stamp) can be placed on the ITO substrate. For example, the material consumption is metered as precisely as possible and the sintering edge is homogeneously restricted. Simultaneously, the quantity of material is weighed before the sintering process and hence good control over the later layer thickness is achieved. Here, the ITO substrate is located on a hot plate with temperature regulation from room temperature up to >160° C. A pressure apparatus is used to press the pressure mold (sinter stamp) into the filling ring onto the colloidal P3HT/PCBM/GOS powder. For this, pressures in the range of 1-20 MPa, for example approximately 5 MPa, are used. In addition, the hot plate is heated to a temperature of 140° C. The pressure and temperature now effects a compaction of the colloidal powder on the ITO Anode. Following a sintering time of approximately 5-10 minutes, the pressure is relieved and finally the pressure mold removed again. What remains is a sintered layer fixed on the ITO anode (layer thickness achieved, for example, 150 µm). In order to prevent powder residue on the pressure mold or the sintered layer from breaking up when the pressure mold is removed, the pressure surface of this mold, which is, for example, made of aluminum or steel can be coated with Teflon (for example by means of CVD, chemical vapor deposition). A pressure mold completely made of Teflon is also possible.

After the sintering, an aluminum-cathode (layer thickness approximately 250 nm) is deposited on the sintered layer by means of physical vapor deposition.

Figure 13:
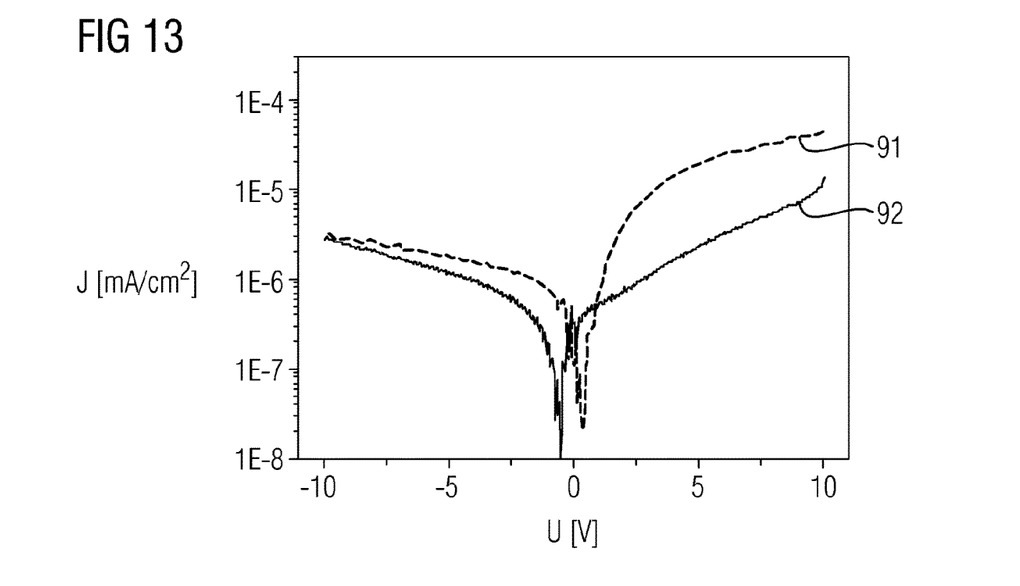
FIGS. 13 and 14 show measured data for the electrical characterization and X-ray sensitivity of an exemplary X-ray detector according to an embodiment.

FIG. 13 depicts the current density voltage characteristics in the dark of an organic photodiode (91) with a sintered, pure P3HT/PCBM layer without a Gd2O2S:Tb-scintillator. For purposes of comparison, the typical current density voltage characteristics of an organic photodiode (92) for the combination of a Gd2O2S:Tb granule coated by a photoactive and electrically active BHJ coating consisting of P3HT and PCBM is depicted. The layer thicknesses are 175 µm for specimen 91 and 90 µm for specimen 92. The dark-current characteristics are measured for both diode concepts. In both cases, the dark-current density achieves the value 3.0 10-6 mA/cm² at −10V.

Figure 14:
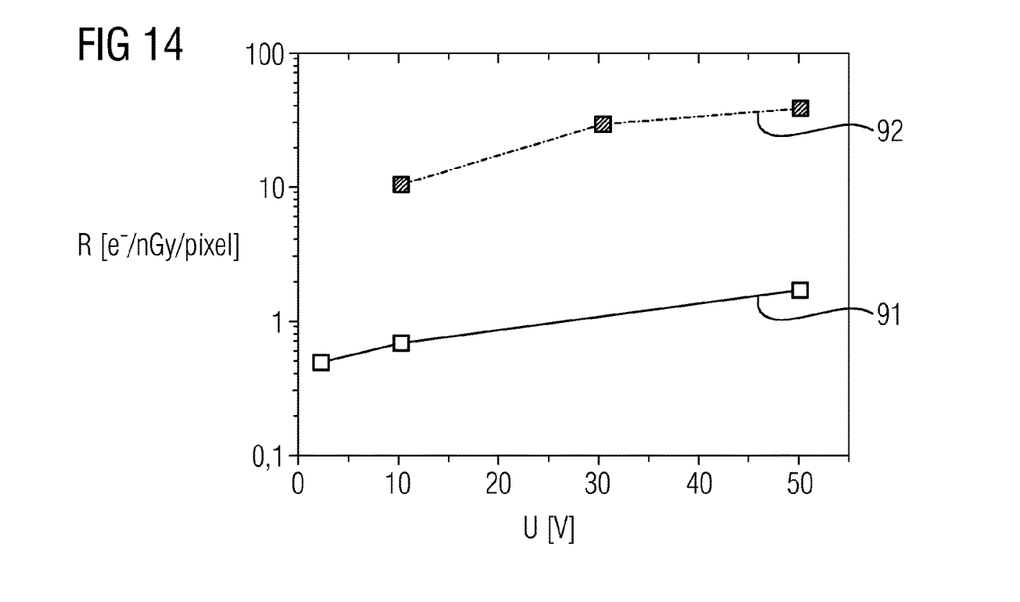

In FIG. 14, the X-ray sensitivity in electrons/nGy/pixel was measured as a function of cut-off voltage applied for both types of specimen, i.e. without GOS (91) or with GOS (92). At the same time, the measured current in ampere was scaled to the typical area of a pixel as a function of the dose rate in Gy/s. A typical pixel size was assumed to be an area of 100 µm×100 µm. For both types of specimen, a significant increase in the X-ray sensitivity is observed with the external voltage. This effect is attributed to the increase in the internal electrical field, which causes the extraction of photogenerated charge carriers due to increasing band bending of the HOMOs in the P3HT or LUMOs in the PCBM to increase. It is noticeable that the X-ray sensitivity increases by virtually an order of magnitude of the GOS/P3HT-PCBM specimens in comparison with pure P3HT/PCBM specimens. Hence, the above-described concept of X-ray quantum absorption via the scintillator granule with subsequent energy transfer and charge transport via the organic coating could be successfully confirmed.

Consequently, it was possible for the first time to demonstrate a new type of material consisting of scintillator particle granules with an organic photodetection and charge-transport shell for the X-ray detection. This concept can be transferred analogously to UV detection or gamma detection.

What is claimed is:

1. A coated scintillator particle, comprising:
a scintillator particle; and
a semiconducting photoactive material coating the scintillator particle;
wherein a thickness of the coating is less than 2.5 times the penetration depth of the radiation emitted by the scintillator particle.

2. The coated scintillator particle of claim 1, wherein the scintillator particle has a diameter of 0.01 µm to 50 µm.

3. The coated scintillator particle of claim 1, wherein the coating of the photoactive material has a thickness of 15 nm to 1500 nm.

4. The coated scintillator particle of claim 1, wherein the photoactive material is at least one of an organic photoactive material or a perovskite semiconductor material.

5. The coated scintillator particle of claim 1, wherein the photoactive material is a photoactive layer in the form of a bulk heterojunction.

6. A method for the production of coated scintillator particles, the method comprising:
dissolving at least one semiconducting photoactive material in a solution including at least one first solvent,
adding scintillator particles to the solution, wherein the scintillator particles include a semiconducting photoactive material coating the scintillator particle,
wherein a thickness of the coating is less than 2.5 times the penetration depth of the radiation emitted by the scintillator particle,
precipitating the coated scintillator particles by adding a further substance, and
removing the first solvent and the further substance.

7. The method of claim 6, wherein the scintillator particles are not soluble in the first solvent.

8. The method of claim 6, wherein the photoactive material comprises at least two organic compounds.

9. The method of claim 6, wherein the scintillator particles are added to the solution while the solution is exposed to ultrasonic waves.

10. The method of claim 6, comprising grinding the coated scintillator particles into a powder after the removal of the first solvent and the further substance.

11. A detector, comprising:
a plurality of coated scintillator particles;
a semiconducting photoactive material coating each of the plurality of scintillator particles,
wherein a thickness of the coating is less than 2.5 times the penetration depth of the radiation emitted by the scintillator particle,
wherein the detector is an X-ray detector, a gamma detector, or a UV detector.

12. The detector of claim 11, comprising:
a substrate with a first electrical contact,
a layer comprising the coated scintillator particles, and
a second electrical contact.

13. A method for producing an X-ray detector, gamma detector or UV detector, the method comprising:
providing a powder comprising coated scintillator particles coated with a semiconducting photoactive material;
applying the powder to a substrate comprising a first electrical contact;
applying pressure to compact the powder;
applying a second electrical contact.

14. The method of claim 13, wherein the step of applying pressure to compact the powder comprises heating the substrate before the application of pressure to compact the powder.

15. The method of claim 13, wherein the application of pressure is performed using a stamp or a roller or by isostatic means.

16. The coated scintillator particle of claim 1, wherein the scintillator particle has a diameter of 0.5 µm to 20 µm.

17. The coated scintillator particle of claim 1, wherein the scintillator particle has a diameter of 1 µm to 10 µm.

18. The coated scintillator particle of claim 1, wherein the coating of the photoactive material has a thickness of 100 nm to 1000 nm.

19. The coated scintillator particle of claim 1, wherein the coating of the photoactive material has a thickness of 150 nm to 600 nm.

20. The method of claim 13, further comprising:
applying a first intermediate layer after applying the powder to the substrate, and
applying a second intermediate layer after applying pressure to compact the powder.

21. The coated scintillator particle of claim 1, wherein the thickness of the coating is less than 1.5 times the penetration depth of the radiation emitted by the scintillator particle.

22. The coated scintillator particle of claim 1, wherein a combination of scintillator particle and semiconducting photoactive material is chosen from the group consisting of: Gd2O2S:Tb or YAG:Ce combined with P3HT:PCBM, Lu2SiO5:Ce combined with F8BT, YGdO:Eu combined with PCPDTBT, Gd2O2S:Tb or YAG:Ce combined with (CH3NH3)PbI3 or (CH3NH3)BrI3, Lu2SiO5:Ce combined with (CH3NH3)PbI3 or (CH3NH3)BrI3, or YGdO:Eu combined with (CH3NH3)PbI3.

23. The coated scintillator particle of claim 1, wherein the scintillator particles comprise Gd2O2S:Tb and the semiconducting photoactive material comprises P3HT:PCBM.

* * * * *